UNITED STATES PATENT OFFICE.

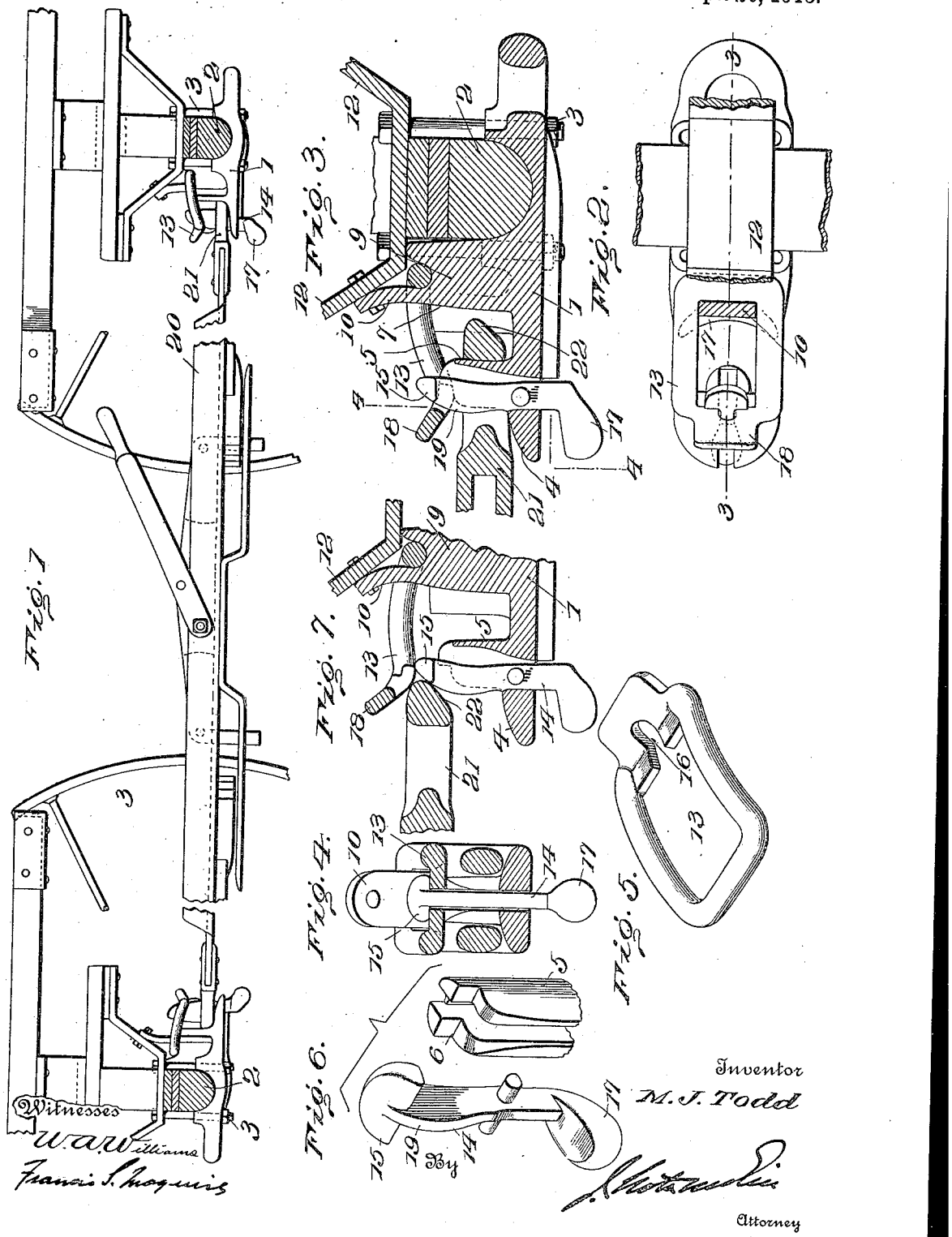
M. J. TODD.
VEHICLE COUPLING.
APPLICATION FILED APR. 25, 1913.
1,136,564.
Patented Apr. 20, 1915.

MARQUIS J. TODD, OF BUFFALO, NEW YORK, ASSIGNOR TO BUFFALO PITTS COMPANY, OF BUFFALO, NEW YORK, A CORPORATION OF NEW YORK.

VEHICLE-COUPLING.

1,136,564.  Specification of Letters Patent.  Patented Apr. 20, 1915.

Application filed April 25, 1913.  Serial No. 763,588.

*To all whom it may concern:*

Be it known that I, MARQUIS J. TODD, of Buffalo, in the county of Erie and State of New York, have invented certain new and useful Improvements in Vehicle-Couplers; and I do hereby declare the following to be a full, clear, and exact description of the invention, such as will enable others skilled in the art to which it appertains to make and use the same.

The primary object of this invention is to provide an improved coupler, especially adapted for wheeled vehicles such as dump-wagons or load-carrying wagons manipulated by a traction engine at either end of a train of vehicles, although the coupler may be employed wherever it is desired to couple cars.

One of the objects of the invention is to insure the automatic locking of the coupling bar and to allow of longitudinal play of such bar without danger of impairing the efficiency of the coupler; and a further object is to provide means for taking the end thrust of the coupling bar as well as its longitudinal pull so that a train of vehicles may be moved in either direction.

In the accompanying drawings, Figure 1 is a side elevation of portions of two vehicles provided with my improvement. Fig. 2 is an enlarged plan view of one of the couplers and a portion of the coupling bar. Fig. 3 is a section on line 3—3 Fig. 2. Fig. 4 is a section on line 4—4 Fig. 3. Fig. 5 is a view of the keeper. Fig. 6 is a view in perspective of the retaining lug and latch. Fig. 7 is a sectional view showing the parts about to be coupled.

Referring to the drawings, 1 indicates a base-plate which according to the means shown is secured to the under side of a cross-member of the chassis, such as the wheel axle 2, by means of bolts 3. This base-plate at its outer end is upwardly inclined at 4, and is provided with an upwardly projecting lug 5 which is cut away on its upper front face to form right-angular shoulders 6. In the rear of lug 5 is a curved wall 7 which is concentric to the lug, and this wall at its center is reinforced by a post 9 having an upwardly and forwardly extending stop 10 which, in the instance shown is bolted to the support 12 upon which the fifth-wheel of the vehicle is mounted.

13 is the keeper, which is shown in the form of a link pivotally supported at its inner end and capable of engaging the shoulders 6 of the lug. Its inner cross-member is shown seated on the top of post 9 in rear of the upwardly extending portion 10 thereof, and according to the means shown is retained on its seat by the fifth wheel supporting member. Normally the free end of the link is locked against shoulders 6 of the lug by a latch which automatically moves into engagement therewith, after being moved out of its normal position by the keeper. This latch is shown as consisting of a vertically disposed lever 14 located in a slot passing longitudinally through the lug and opening through the front face thereof. At its upper end this latch lever has laterally projecting flanges 15 which normally extend over the front cross-member of the link on opposite sides of a slot 16 formed therein coincident with the slot in the lug. The lower end of the latch lever is weighted at 17 so that its upper end will normally lie over the cross member of the link and lock it in place. The link at its outer end has an upwardly extending lip 18, and the outer longitudinal edge of the latch lever is slightly curved, as at 19, where it normally projects beyond the face of the lug. The head of the latch lever is also slightly curved.

The coupling bar 20 at each end is equipped with an eye piece 21, the underside of which is beveled at 22 so that as the coupling bar strikes the upwardly inclined face 4 of the coupler base it will rise, and upon contacting with the outwardly curved protruding edge of the latch will turn the latter on its fulcrum, moving it out of engagement with the keeper, and upon striking the underside of the lip of the keeper, the latter will be elevated a distance sufficient to permit the eye of the coupling bar to ride over the lug, and upon the eye striking stop 10 or the wall 7 it will be arrested in position to fall over the lug. As soon as the eye encircles the latter the keeper will automatically fall into its normal position, and in so doing its front cross piece upon striking the upper end of the latch will move it out of the way to permit said cross piece to engage shoulders 6, whereupon the latch will lock the keeper against accidental displacement.

The eye in the end of the coupling bar may move vertically as well as laterally and longitudinally. Hence the coupled vehicles may readily conform to unevenness in the road-bed without putting undue strain upon any of the parts of the coupler. Normally the draft on the coupling bar will be exerted against the inner face of the upwardly projecting lug, but when the direction of travel of the train is reversed the coupling bar will exert pressure against the concentrically-curved wall 7.

It will be seen that the action of the coupler is automatic, that is to say, when the coupling bar is brought into engagement with the end of the coupler it will disengage the latch from the keeper, and once it is in position the keeper is automatically locked by the latch. Furthermore the keeper strengthens the lug and is securely locked thereto. Coupling may be effected even when the coupling bar is out of direct line, and its travel will always be arrested to engage the lug by contact with the curved wall 7 or the stop 10.

I claim as my invention:

1. A coupler for wheeled vehicles comprising, in combination, a base having an upwardly projecting lug, a coupling bar designed to be held by said lug, a pivoted keeper designed to engage the upper end of said lug to retain the coupling bar in engagement therewith, and a latch supported by said lug for retaining the keeper in engagement with the latter.

2. A coupler for wheeled vehicles comprising, in combination, a base having an upwardly projecting lug, a coupling bar designed to be held by said lug, a pivoted keeper designed to engage the upper end of said lug to retain the coupling bar in engagement therewith, and a vertically disposed latch supported by said lug for retaining the keeper in engagement with the latter, said keeper and latch being constructed and arranged to allow the latch to be moved by the coupling bar out of engagement with the keeper and the latter out of engagement with the lug when coupling is being effected.

3. The combination with a base having an upwardly projecting lug, and a coupling bar designed to be held by said lug, of a keeper pivoted above the base and having at its free end a cross member designed to rest upon said lug to retain the coupling bar thereon, and a latch pivoted in said lug and having laterally projecting ears for extending over said cross member to lock the keeper to the lug.

4. The combination with a base having an upwardly projecting lug formed with a vertically extending slot and shoulders at its upper end, a link pivoted at its rear end and having its front cross piece designed to rest on said shoulders of the lug, said link having a slot in said cross piece, a vertically-disposed latch extending through said slot and having laterally arranged ears for extending over said cross piece on either side of said slot, said latch being automatically moved out of its normal position by said link when the latter is being lowered into engagement with said shoulders.

5. The combination with a base having an upwardly projecting lug and a wall curved concentrically to said lug in rear thereof, of a coupling bar having an eye through which such lug is designed to project, the end of said coupling bar being capable of bearing against said wall, a keeper pivoted to said base at one end and having its other end designed to engage the upper end of said lug to retain the coupling bar thereon, and a pivoted latch on said lug for engaging and holding said keeper, said latch being automatically moved out of its engagement with the keeper and the keeper from the lug in the act of coupling.

6. The combination with a base having an upwardly projecting lug, of a vertically disposed latch mounted on said lug, a keeper pivoted to the base in rear of said lug, said keeper being in the form of a link having at its front end an upwardly extending lip, and a coupling bar having an eye, whereby, in coupling, when said eye strikes the latch it will free the link and upon engaging the lip of the latter will raise it from the lug, said latch being constructed and arranged to automatically reëngage and lock said link.

7. The combination with a base having an upwardly projecting lug formed with a vertically extending slot, of a vertically disposed latch in said slot having at its upper end laterally extending portions, a keeper pivoted to the base in rear of said lug, said keeper being in the form of a link having in its front cross member a slot coincident with the slot in the lug and designed to receive said latch, whereby the laterally extending portions thereof will project over said cross piece, said link at its front end having an upwardly extending lip and the front edge of said latch normally projecting out of the slot of said lug, and a coupling bar having an eye, whereby, in coupling, when said eye strikes the latch it will free the link and upon engaging the lip of the latter will raise it from the lug.

8. The combination with a base having an upwardly projecting lug, a wall in rear of said lug curved concentrically thereto, and an upwardly extending stop above said wall, of a coupling bar having an eye designed to engage said lug, said bar being limited in its movement by its eye contacting with said wall or stop, a pivoted keeper extending over the space between said wall and lug, and a latch supported by said lug for retaining said keeper in engagement with the lug.

In testimony whereof, I have signed this specification in the presence of two subscribing witnesses.

MARQUIS J. TODD.

Witnesses:
FRANCIS S. MAGUIRE,
MILDRED P. IMIRIE.

Copies of this patent may be obtained for five cents each, by addressing the "Commissioner of Patents, Washington, D. C."